United States Patent [19]
Kaji et al.

[11] 3,976,612
[45] Aug. 24, 1976

[54] POLYETHYLENE COMPOSITION

[75] Inventors: Hidehiko Kaji; Takeshi Matsumoto; Norio Sugi; Atsuo Ikenaga; Shoichi Iwata; Masami Tomikawa, all of Chiba, Japan

[73] Assignee: Idemitsu, Kosan Kabushiki-Kaisha (Idemitsu Kosan Co., Ltd.), Tokyo, Japan

[22] Filed: Feb. 24, 1975

[21] Appl. No.: 552,182

Related U.S. Application Data

[63] Continuation-in-part of Ser. No. 420,076, Nov. 29, 1973, abandoned.

[30] Foreign Application Priority Data

Nov. 30, 1972 Japan............................. 47-119326

[52] U.S. Cl........................... 260/23 R; 260/28.5 A; 260/836; 260/31.8 PQ; 260/33.6 PQ; 526/352; 528/502
[51] Int. Cl.².......................................... C08L 91/00
[58] Field of Search............ 260/31.8 PQ, 29.6 PM, 260/23 XA, 33.6 PQ, 836, 87.5 C, 28.5 A, 23 R

[56] References Cited
UNITED STATES PATENTS 3,278,471  10/1966  Rairdon .......................... 260/23 R
3,409,574  11/1968  Gros .............................. 260/28.5 A Primary Examiner—Lewis T. Jacobs
Assistant Examiner—William E. Parker
Attorney, Agent, or Firm—William J. Daniel

[57] ABSTRACT

A polyethylene composition consisting of: (A) a high density polyethylene with a viscosity-average molecular weight of $10 \times 10^4$ to $20 \times 10^4$, a number average molecular weight of $1 \times 10^4$ or greater and a ratio between weight average molecular weight and number average molecular weight of 20 or less; (B) at least one inorganic calcium compound selected from a group consisting of calcium sulfite, calcium sulfate and calcium carbonate; and (C) a solid lubricant, if desired, the composition produces a film or sheet whose internal tearing resistance is high and equal in both longitudinal and lateral directions and the processibility of the resin composition may be extremely improved by incorporating as a fourth component, within a range of 1:5 to 5:1 in weight ratio with respect to the aforementioned high density polyethylene, a different high density polyethylene with a melt index of 0.1 to 1.0.

7 Claims, No Drawings

POLYETHYLENE COMPOSITION

This application is a continuation-in-part of application Ser. No. 420,076, filed Nov. 29, 1973, and now abandoned.

BACKGROUND OF THE INVENTION

The present invention relates to novel polyethylene resin compositions containing an inorganic calcium compound filler and having excellent internal tearing resistance and processibility. More specifically, the present invention relates to a novel polyethylene resin composition obtained by incorporating into a polyethylene having particular molecular weight characteristics one or more inorganic calcium compound selected from a group consisting of calcium sulfite, calcium sulfate and calcium carbonate.

It is well known in the art that polyethylene products having increased mechanical strength, particularly rigidity, may be obtained by incorporating an inorganic filler into polyethylene. In this case, however, the tenacity or tensile strength of the product tends to be reduced when its rigidity is increased. In particular, the tenacity of the product obtainable is extremely reduced if the inorganic filler is added to polyethylene in excess of a certain amount. This reduction of the tenacity is recognized as an extreme reduction of the internal tearing resistance in such products as films and sheets, so that it constitutes a great disadvantage in the use of these materials in industry.

In order to overcome this deficiency and produce polyethylene articles having improved mechanical properties, the inventors of the present invention had earlier proposed a method of preparing particular polyethylene blends by incorporating calcium sulfite as the filler. However, the internal tearing resistance of films and sheets produced from such materials was found to greatly differ between longitudinal and lateral directions. By way of example, films and sheets obtained from the aforementioned polyethylene blends through calendering had internal tearing resistance in the direction of calendering (or longitudinal direction) as low as only a fraction of that in the direction transverse to the calendering direction (or lateral direction). Therefore, the use of these films and sheets is limited due to the necessity of differentiating between their longitudinal and lateral directions in their use. In addition, it is rather difficult to obtain a homogeneous blend of polyethylene and inorganic filler so that processibility of the blend is inferior. Therefore, the product is prone to pores and pin holes. Also, filler particles are likely to remain therein in an agglomerated form so that it is difficult to obtain a high quality product.

BRIEF SUMMARY OF THE INVENTION

Accordingly, it is an object of the present invention to provide a polyethylene resin composition containing an inorganic filler which is excellent in processibility and whose internal tearing resistance is well balanced in both longitudinal and lateral directions.

It is another object of this invention to provide a polyethylene resin composition consisting of a high density polyethylene having particular molecular characteristics and a comparatively high quality of an inorganic calcium compound filler, particularly calcium sulfite.

It is a further object of the invention to provide a polyethylene resin composition, whose processibility is improved and which consists of a blend of a high density polyethylene having particular molecular weight characteristics and a different high density polyethylene having a particular melt index characteristic, a comparatively high quantity of an inorganic calcium compound filler and a solid lubricant if desired.

The above and other objects, features and advantages of the invention will be more fully apparent from the following description.

DETAILED DESCRIPTION OF THE INVENTION

According to the present invention, the above objects can be achieved by incorporating into a high density polyethylene having such molecular characteristics as a viscosity average molecular weight of $10 \times 10^4$ to $20 \times 10^4$, a number average molecular weight of $1 \times 10^4$ or greater and a ratio between weight average molecular weight and number average molecular weight of 20 or less, at least one inorganic calcium compound selected from a group consisting of calcium sulfite, calcium sulfate and calcium carbonate.

In order to obtain a polyethylene film or sheet having excellent mechanical properties with the internal tearing resistance well balanced between longitudinal and lateral directions in accordance with the present invention, it is necessary, in addition to using at least one inorganic calcium compound selected from a group consisting of calcium sulfite, calcium sulfate and calcium carbonate, to use a high density polyethylene having specific molecular characteristics, namely (i) a viscosity-average molecular weight ranging from $10 \times 10^4$ to $15.5 \times 10^4$, (ii) a number average molecular weight of $1 \times 10^4$ or greater and (iii) a ratio between weight average molecular weight and number average molecular weight of 20 or less and a melt index of 0.01–0.1. A polyethylene having such characteristics has not been commercially available but may be prepared without any particular difficulty by polymerizing ethylene by the usual low pressure or Ziegler method using a standard catalyst mixture of trialkylaluminum and titanium tetrachloride at a molar ratio of 1.2–2.9 suspended in an inert liquid hydrocarbon medium, e.g., hexane, heptane, petroleum ether, benzene, etc., at a temperature in the range of about 50°–80°C under about atmospheric pressure for a time of about 2 hours. If necessary to achieve the above-defined molecular weight characteristics, the polymerization product can be subjected to a conventional fractionalizaton step using a solvent-non-solvent combination such as the p-xylene-methyl cellusolve series. The polyethylene used according to the invention need not be a polymer of ethylene alone, but ethylene copolymers prepared by copolymerizing ethylene with propylene, butene and hexene, etc., may be used as well, provided their molecular weight characteristics fall within the aforementioned ranges.

The number average molecular weight and weight average molecular weight of the polyethylene according to the present invention are determined by gel permeation chromatography. In this case, four columns with respective gel hole diameters of $10^3$ A, $10^4$ A, $10^6$ A and $10^7$ A are used in series connection. Also, o-dichloro-benzene is used as solvent and the measuring temperature is set at 130°C. The viscosity-average molecular weight is calculated from the limiting viscosity of the polyethylene, which is determined by using refined decalin as the solvent, setting the concentration of polyethylene in decalin at 50 mg/100 ml and the measuring temperature at 135°± 0.05°C and using $N_2$ stream as atmosphere and Ubbelohde's tube as the viscosity tube, by the following equation:

$$\overline{M}_v = 2.51 \times 10^4 [\eta]^{1.235}$$

where $\overline{M}_v$ represents the viscosity-average molecular weight and $[\eta]$ represents the limiting viscosity.

The inorganic calcium compound used as the filler according to the present invention is preferably one in the form of powder prepared in the usual manner and having a grain size ranging between 0.1 and 10 microns. Preferably, the inorganic calcium compound is used within a range of 3:7 to 8:2 in weight ratio with respect to polyethylene.

The composition according to the invention is suitable as material for forming films having improved internal tearing resistance characteristics. When films and sheets are manufactured by calendering the composition according to the present invention, the lateral tearing resistance of the product tends to be increased with increasing working temperature (roller temperature), while the longitudinal tearing resistance tends to be reduced with increasing working temperature due to unique effects of the polyethylene used. Thus, by appropriately setting the working temperature within the general range of about 140–200°C when forming a film from the composition according to the present invention, it is possible to make the longitudinal tearing resistance and lateral tearing resistance of the film equal. Also, by choosing a working temperature at the upper end of this range, it is possible to obtain a very high lateral tearing resistance of the film or sheet produced as compared to the longitudinal tearing resistance. Thus, according to the present invention, by forming two different sheets with two calendering machines, one operated at a low temperature and the other operated at a high temperature, and laminating these two sheets, one having high lateral tearing resistance and the other having high longitudinal tearing resistance, it is possible to continuously obtain a product whose internal tearing resistance is very high and well balanced between longitudinal and lateral directions.

According to a different embodiment of the present invention, it is possible to provide a resin product having improved processibility by using as the high density polyethylene, into which the aforementioned inorganic calcium compound filler is to be incorporated, a blend consisting of (a) a high density polyethylene with a viscosity-average molecular weight of $10 \times 10^4$ to $20 \times 20^4$, a number average molecular weight of $1 \times 10^4$ or greater and a ratio between weight average molecular weight and number average molecular weight of 10 to 20 and (b) a high density polyethylene with a melt index of 0.1 to 1.0, a viscosity average molecular weight of $5-10 \times 10^4$ and a number average molecular weight of $0.5-1 \times 10^4$. For example, it is possible to use "Hizex 5100LP," "Hizex 5200B," "Hizex 5000S," "Hizex 5100E," "Hizex 5000F," and "Hizex 5000H" (all being trade names of products by Mitsui Sekiyu Kagaku Inc.). Also, it is possible to use "Showlex 5008," "Showlex 6009B," "Showlex 5003," "Showlex 4002B," "Showlex S6002," "Showlex 5003E" and "Showlex 4002E" (all being tradenames of products by Nippon Olefin Kagaku Inc.). The polyethylene used as component (b) need not be a polymer of ethylene alone, but ethylene copolymers prepared by copolymerizing ethylene with propylene, butene, hexene, etc., may be used as well, provided the aforementioned melt index characteristic is met. The proportion of the component (b) is within a range of 1:5 to 5:1 in weight ratio with respect to component (a).

In order to obtain a product having sufficient secondary processibility, according to the present invention, it is preferable to incorporate a solid lubricant into the composition at a normal temperature and under normal pressure. Such lubricant may be higher fatty acid metal salts, wax, higher alcohols, higher fatty acid polyhydric alcohol esters, higher fatty acid amines and fatty acid esters of polyethylene glycol. These lubricants may be used either alone or in the form of a blend. The quantity of the lubricant is preferably set within a range from 0.3 to 5.0% by weight with respect to the total weight of the other components, namely, the total high density polyethylene and inorganic calcium compound filler. In this case, however, the intended end cannot be achieved by using a liquid lubricant such as liquid paraffin. If such liquid lubricant is used, it would reduce the hardness of the sheet product, which constitutes one of the features of the high-filler-containing composition according to the present invention, thus extremely reducing the compression strength required for the product. Also, such liquid lubricant would gradually bleed to the surface of the product, giving rise to such inconveniences as collection of dust on the product surface.

The following examples are given to illustrate the present invention in further detail.

EXAMPLE 1

To 30 parts by weight of each of various samples of polyethylene having characteristics as listed in Table 1 was added 70 parts by weight of calcium sulfite (with a grain size ranging from 0.5 to 7.0 microns). Each resultant mixture was then kneaded by using a kneading mixer with the rotor speed set at 60 rpm at a casing temperature of 150°C for 4 minutes. The temperature of the paste at this time was 200° to 210 C. Then, the paste was further kneaded by using a mixing roller having a temperature of 170°C to render the paste temperature uniform. The resultant material thus obtained was rolled into a film having a thickness of 0.2 millimeters by using a reverse L-type calender having four rollers.

Table 1 shows the longitudinal tearing resistance and lateral tearing resistance of the films thus obtained from the polyethylene samples having the listed polyethylene molecular weight characteristics for various working temperatures (roller temperatures).

In Table 1, samples 1 to 4 fall under the scope of the present invention and samples 5 to 9 are comparison samples. It will be seen from Table 1 that with the low pressure type polyethylene having molecular weight characteristics falling within the specified ranges according to the present invention, the tearing resistance of the film obtained is generally improved. Also, the tearing resistance in the lateral direction is increased while that in the longitudinal or transverse direction is reduced with an increase of the working temperature. It will thus be seen that the tearing resistance can be made equal in both longitudinal and lateral direction by appropriately setting the working temperature. It will also be seen that the ratio between longitudinal tearing resistance and lateral tearing resistance obtainable at a low working temperature can be inverted by increasing the working temperature to a certain temperature. In contrast, this is impossible with the low pressure type polyethylene not falling under the scope of the invention. Also, it is impossible with the medium pressure type polyethylene to make the tearing resistance equal in both longitudinal and lateral directions and invert the longitudinal and lateral tearing resistance ratio.

TABLE 1

| Ex. No. | Type & Mol. Wt. Char. of P-E | | | | Work. Temp. (°C) | Tear Resis.(g) | |
|---|---|---|---|---|---|---|---|
| | Type | $M_v$[4] | $M_n$[5] | $M_w$[6]$/M_n$ | | Long. | Trans. |
| 1 | L.P Type P-E | 10.0 | 1.54 | 17.5 | 140 145 160 | 220 450 1567 | 1014 349 387 |
| 2 | L.P Type P-E | 11.6 | 1.16 | 19.9 | 145 150 160 | 375 573 2196 | 1195 623 322 |
| 3 | L.P Type P-E | 13.7 | 1.56 | 15.1 | 145 170 | 319 2255 | 1820 399 |
| 4 | L.P Type P-E | 15.4 | 1.55 | 13.6 | 145 170 | 471 1852 | 1189 335 |
| 5 | L.P Type P-E | 6.3 | 1.03 | 8.9 | 145 160 | 154 198 | 157 124 |
| 6 | L.P Type P-E | 11.9 | 0.92 | 17.4 | 145 165 | 163 231 | 613 243 |
| 7 | L.P Type P-E | 8.5 | 0.77 | 28.4 | 145 160 | 121 134 | 102 116 |
| 8 | L.P Type P-E | 12.0 | 0.81 | 24.6 | 145 165 | 291 242 | 162 183 |
| 9 | M.P[3] Type P-E | 10.0 | 1.31 | 10.3 | 145 170 | 270 305 | 1451 1020 |

[1] "Hizex 5100E"
[2] "Hizex 7000F"
[3] "Showlex 4250HM"
[4] Viscosity-average mol. wt. × 10⁴
[5] Number average mol. wt. × 10⁴
[6] Weight average mol. wt.

EXAMPLE 2

Various polyethylene samples listed as polyethylene (a) in Tables 2-4 having the listed molecular weight characteristics were kneaded individually in quantities as listed in the Tables together with the listed quantity of the corresponding polyethylene listed as polyethylene (b) with a particular melt index and 70 weight parts of calcium sulfite ($CaSO_3 \cdot 1/2H_2O$ with a grain size ranging from 0.5 to 7.0 microns) by using a kneading mixer with the rotor speed set at 60 rpm at a casing temperature of 150°C. The temperature of the kneaded blend composition at this time was 200° to 210°C. The paste was then further kneaded by using a mixing roller having a temperature of 170°C to render the paste having a temperature uniform. The resultant material thus obtained was rolled into a sheet having a thickness of 0.2 millimeters by using a reverse L-type calender having four rollers (at a roller temperature of 145°C).

Tables 2-4 list the longitudinal tearing resistance of each obtained sheet and the processibility of each polyethylene blend composition sample.

In this example, the processibility of the polyethylene blend composition was evaluated by counting the number of pores, the number of pin holes and the number of filler particle agglomerates contained in portions of the sheet of each sample in the following manner:

1. Number and Location of Sheet Portions to be Sampled: Three sheet portions each with dimensions of 20 cm × 20 cm were taken out from different parts of a central area of the sheet obtained by calendering.
2. Ranking of the Results of Measurement: The ranking was based on the average of the results of measurement made on the three sheet portions of each sample.
   a. Number of Pores: Pores greater than a size of 1 mm in width by 2 mm in length were counted and the ranking made as follows: Rank A = 0 to 3 pores in average; Rank B = 4 to 9 pores in average; Rank C = 10 or more pores in average.
   b. Number of Pin Holes: Holes that permit seeing through the sheets were determined as pin holes and the ranking was made as follows: Rank A = 0 hole in average; Rank B = 1 to 2 holes in average; Rank C = 3 or more holes in average.
   c. Number of Agglomerates: Filler particle agglomerates with a diameter in excess of about 2 mm were counted and the ranking was made as follows: Rank A = 0 agglomerate in average; Rank B = 1 to 9 agglomerates in average; Rank C = 10 or more agglomerates in average.
3. Evaluation of the Processibility: The processibility is evaluated as excellent if all the measuring items (a), (b) and (c) are rank A, as good if any one of the items is rank B, but none of these items is rank C and as bad if any one of the items is rank C.

TABLE 2

| Ex. No. | Composition (Weight %) | | | | | Tear Resis.(g) | | Process-ibility |
|---|---|---|---|---|---|---|---|---|
| | Polyethylene (a) Mol. Wt. Char.[1] | Amt. | Polyethylene (b) MI[2] | Amt. | $CaSO_3 \cdot \frac{1}{2}H_2O$ Amt. | Trans. | Long. | |
| 1 | $\overline{M}_v$=15.2 | 10 | 0.04[3] | 20 | 70 | 213 | 674 | Bad |
| 2 | | 15 | 0.25[4] | 15 | 70 | 219 | 1790 | Good |
| 3 | $\overline{M}_n$=1.50 | 15 | 0.4[5] | 15 | 70 | 202 | 1409 | Excellent |
| 4 | | 20 | 0.9[6] | 10 | 70 | 217 | 1102 | Good |
| 5 | $\overline{M}_v/\overline{M}_n$=16.4 | 20 | 1.0[7] | 10 | 70 | 787 | 956 | Good |
| 6 | | 25 | 3.0[8] | 5 | 70 | 571 | 265 | Bad |
| 7 | | 25 | 6.5[9] | 5 | 70 | 691 | 300 | Bad |

[1] All average molecular weight × 10⁴.
[2] The melt index is in grams per 10 min.
[3] "Hizex 7000F"
[4] "Hizex 5100LP"
[5] "Hizex 5200B"
[6] "Hizex 3300F"
[7] "Showlex 5008"
[8] "Showlex 5030"
[9] "Hizex 2100GP"

TABLE 3

| Ex. No. | Composition (Weight %) Polyethylene (a) | | | | Polyeth. (b) | | CaSO₃·½H₂O Amt. | Tear Resis. (g) | | Processibility |
|---|---|---|---|---|---|---|---|---|---|---|
| | $M_v$ | $M_n$ | $M_w/M_n$ | Amt | MI[2] | Amt. | | Trans. | Long. | |
| 8 | 8.5[1] | 0.77[1] | 28.4 | 30 | — | — | 70 | 134 | 116 | Bad |
| 9 | 10.0 | 1.54 | 17.5 | 25 | 0.25[3] | 5 | 70 | 373 | 625 | Good |
| 10 | 12.3 | 1.48 | 15.8 | 20 | 0.25[3] | 10 | 70 | 252 | 1331 | Excellent |
| 11 | 14.4 | 1.36 | 15.7 | 15 | 0.25[3] | 15 | 70 | 187 | 1241 | Excellent |
| 12 | 16.9 | 1.94 | 15.2 | 10 | 0.25[3] | 20 | 70 | 202 | 1051 | Good |
| 13 | 16.9 | 1.94 | 15.2 | 30 | — | — | 70 | Difficult to work | | |
| 14 | 12.6 | 0.74 | 38.6 | 30 | — | — | 70 | 241 | 662 | Bad |
| 15 | 12.6 | 0.74 | 38.6 | 25 | 0.25[3] | 5 | 70 | 307 | 354 | Bad |
| 16 | 12.0 | 0.81 | 24.6 | 30 | 0.04[4] | 5 | 70 | 242 | 183 | Bad |

[1]All average molecular weights are × 10⁴.
[2]The melt index is in grams per 10 min.
[3]"Hizex 5100E"
[4]"Hizex 7000F"

TABLE 4

| Ex. No. | Comp. (Wt %) | | | Tear Resis.(g) | | Processibility |
|---|---|---|---|---|---|---|
| | P-E (a)[1] | P-E (b)[2] | CaSO₃·½H₂O | Long. | Trans. | |
| 17 | — | 30 | 70 | 134 | 116 | Bad |
| 18 | 5 | 25 | 70 | 181 | 540 | Good |
| 19 | 10 | 20 | 70 | 206 | 823 | Excellent |
| 20 | 15 | 15 | 70 | 208 | 1032 | Excellent |
| 21 | 20 | 10 | 70 | 252 | 1331 | Excellent |
| 22 | 25 | 5 | 70 | 237 | 1485 | Good |
| 23 | 30 | — | 70 | 296 | 1598 | Bad |

[1]P-E (a) had a viscosity-average molecular weight of 12.3 × 10⁴, a number average molecular weight of 1.48 × 10⁴ and a ratio between weight average molecular weight and number average molecular weight of 15.8.
[2]P-E (b) was "Hizex 5100E" with a melt index of 0.25.

EXAMPLE 3

Various polyethylenes listed in Table 5, having the listed molecular weight characteristics, were kneaded individually in quantities as listed in Table 5 together with the listed quantity of the corresponding polyethylene listed as polyethylene having a particular melt index, 70 weight parts of the corresponding inorganic calcium compound as listed (with a grain size ranging from 0.5 to 7.0 microns) and the listed quantity of the corresponding lubricant as listed by using a kneading mixer with the rotor speed set at 60 rpm at a casing temperature of 150°C. The temperature of the kneaded blend composition at this time was 200° to 210°C. The paste was then further kneaded by using a mixture roller having a temperature of 170°C to render the paste temperature uniform. The resultant material thus obtained was rolled into a sheet having a thickness of 0.4 mm by using a reverse L-type calender having four rollers (at a roller temperature of 170°C).

From each sheet thus obtained, a rectangular box was produced by using an ordinary vacuum-forming machine provided with a mechanism for simultaneously heating the opposite sides of the sheet under a watt density condition of 6 watts/cm².

Table 5 lists the longitudinal tearing resistance and transverse tearing resistances for each of the sheets produced as well as the deformation index thereof.

The deformation index serves as a factor for evaluating the quality of the product. The greater the index, the better the product and the processibility of the polyethylene resin composition used as the material for the product. Denoting the deformation index by Y, it is defined as $$Y = B/A \times 100 \; (\%),$$

where A is the area of the sheet prior to forming the box and B is the total area of the box when the ratio of the wall thickness of the product to the thickness of the sheet prior to the formation is 0.2.

TABLE 5

| Ex. No.[1] | Composition (Pts by Wt.) | | | | | | | | | | Test Results | | 2nd Molding Mold. Prop. Est. Def. Index (%) |
|---|---|---|---|---|---|---|---|---|---|---|---|---|---|
| | | | | | | | | | | | 1st Molding Tear Resis. | | |
| | | Polyeth. (a) | | | Polyeth. (b) | | Inorg. Cal Compound | | Lubricant | | | | |
| | $M_v$[2] | $M_n$ | $M_w/M_n$ | Amt | MI[3] | Amt | Type | Amt | Type | Amt | Trans. | Long. | |
| 1 | 10.0 | 1.54 | 17.5 | 10 | 0.25 | 20 | CaSO₃ | 70 | Cal. Stear | 0.5 | 1090 | 520 | 320 |
| 2 | 10.0 | 1.54 | 17.5 | 25 | 0.25 | 5 | CaSO₄ | 70 | High f.a. Amide | 2.0 | 2350 | 980 | 232 |
| 3 | 13.2 | 1.82 | 12.4 | 10 | 0.2 | 20 | CaSO₃ | 70 | High f.a. Amide | 1.0 | 1450 | 620 | 268 |
| 4 | 13.2 | 1.82 | 12.4 | 10 | 0.2 | 20 | CaCO₃ | 70 | Butyl Stear | 0.8 | 1080 | 780 | 284 |
| 5 | 13.2 | 1.82 | 12.4 | 10 | 0.2 | 20 | CaSO₄ | 70 | m.c. Wax | 0.3 | 970 | 680 | 235 |
| 6 | 15.3 | 1.80 | 14.8 | 10 | 0.25 | 20 | CaSO₃ | 70 | Cal. Stear | 0.5 | 1890 | 600 | 251 |
| 7 | 11.6 | 1.16 | 19.9 | 15 | 0.4 | 15 | CaSO₃ | 70 | High f.a. Amide | 4.0 | 910 | 670 | 302 |
| 8 | — | — | — | — | 0.2 | 30 | CaSO₃ | 70 | Cal. Stear | 0.5 | 360 | 210 | 220 |
| 9 | 13.2 | 1.82 | 12.4 | 30 | — | — | CaSO₃ | 70 | Cal. Stear | 2.0 | >2900 | 960 | 167 |
| 10 | Hizex million | | | 3 | 0.2 | 27 | CaSO₃ | 70 | High f.a. | 1.0 | 870 | 640 | 130 |

TABLE 5-continued

| Ex. No.[1] | $M_r$[2] | Polyeth. (a) $M_n$ | $M_w/M_n$ | Amt | Polyeth. (b) MI[3] | Amt | Inorg. Cal Compound Type | Amt | Lubricant Type | Amt | 1st Molding Tear Resis. Trans. | Long. | 2nd Molding Mold. Prop. Est. Def. Index (%) |
|---|---|---|---|---|---|---|---|---|---|---|---|---|---|
| 11 | 12.6 | 0.74 | 38.6 | 10 | 0.2 | 20 | $CaSO_3$ | 70 | Amide High f.a. | 0.5 | 460 | 280 | 229 |
| 12 | 13.2 | 1.82 | 12.4 | 20 | 5.5 | 10 | $CaSO_3$ | 70 | Amide High f.a. | 0.3 | 490 | 400 | 230 |
| 13 | 13.2 | 1.82 | 12.4 | 15 | 0.2 | 15 | $CaSO_3$ | 70 | Amide — | — | 1440 | 620 | 191 |

[1]Ex. 1 to 7 illustrate the invention while Ex. 8 to 13 are comparison examples.
[2]All average molecular weights are $\times 10^4$.
[3]The melt index is in grams per 10 minutes.

What is claimed is:

1. A calendered filled polyethylene sheet material obtained by kneading together under a temperature within the range of about 140°–170°C and then calendering into sheet form a polyethylene resin composition consisting essentially of:
   a. a first high density polyethylene having a viscosity-average molecular weight of $10 \times 10^4$ to $20 \times 10^4$, a number average molecular weight of $1 \times 10^4$ or greater and a ratio between weight average molecular weight and a number average molecular weight of 20 or less, and a melt index of about 0.01–0.09;
   b. a second high density polyethylene distinct from said first polyethylene (a) having a viscosity-average molecular weight of 5–10 $\times 10^4$, a number average molecular weight of 0.5–1.0 $\times 10^4$ and a melt index of 0.1 to 1.0;
   c. at least one inorganic calcium compound having a particle size of about 0.1–10 $\mu$ and selected from a group consisting of calcium sulfite, calcium sulfate and calcium carbonate in an amount sufficient to give a weight ratio relative to the aggregate of said polyethylene being 3:7 to 8:2, and
   d. about 0.3 to 5.0% by weight of a solid waxy lubricant with respect to the total quantity of (a) and (b), the second polyethylene (b) being present in an amount sufficient to render the composition workable by kneading and calendering up to a ratio of 5:1 relative to said first polyethylene (a).

2. The sheet material according to claim 1 wherein said second polyethylene (b) is present in an amount equal to a ratio of 1:5 to 5:1 relative to the amount of said first polyethylene (a).

3. The sheet material according to claim 1 wherein said calcium compound is calcium sulfite.

4. The sheet material according to claim 1 wherein at least about 0.3% by weight of said lubricant is present.

5. A method of making a polyethylene sheet material which comprises kneading under a temperature within the range of about 140°–170°C and then calendering into sheet form a mixture consisting essentially of:
   (a) a first high density polyethylene having a viscosity-average molecular weight of $10 \times 10^4$ to $20 \times 10^4$, a number average molecular weight of $1 \times 10^4$ or greater and a ratio between weight average molecular weight and a number average molecular weight of 20 or less and a melt index of 0.01 0.09;
   b. a second high density polyethylene distinct from said first polyethylene (a) having a viscosity-average molecular weight of 5–10 $\times 10^4$, a number average molecular weight of 0.5–1.0 $\times 10^4$, and a melt index of 0.1 to 1.0;
   c. at least one inorganic calcium compound selected from a group consisting of calcium sulfite, calcium sulfate and calcium carbonate in an amount sufficient to give a weight ratio relative to the aggregate of said polyethylene being 3:7 to 8:2; and
   d. about 0.3 to 5.0% by weight of a solid lubricant with respect to the total quantity of (a) and (b), the second polyethylene (b) being present in an amount sufficient to render the composition workable by kneading and calendering up to a ratio of 5:1 relative to said first polyethylene (a).

6. The method according to claim 5 wherein said second polyethylene (b) is present in an amount equal to a ratio of 1:5 to 5:1 relative to the amount of said first polyethylene (a).

7. The method according to claim 5 wherein said calcium compound is calcium sulfite.

* * * * *

UNITED STATES PATENT AND TRADEMARK OFFICE
CERTIFICATE OF CORRECTION

PATENT NO. : 3,976,612
DATED : August 24, 1976
INVENTOR(S) : Hidehiko Kaji et al It is certified that error appears in the above-identified patent and that said Letters Patent are hereby corrected as shown below:

In the Claims:

Column 10, line 28 (Claim 5, line 10) "0.01 0.09" should read -- 0.01-0.09 --.

Signed and Sealed this

Twenty-third Day of November 1976

[SEAL]

Attest:

RUTH C. MASON
*Attesting Officer*

C. MARSHALL DANN
*Commissioner of Patents and Trademarks*